United States Patent [19]

Arata

[11] Patent Number: 5,689,577
[45] Date of Patent: Nov. 18, 1997

[54] PROCEDURE FOR THE SIMPLIFICATION OF TRIANGULAR SURFACE MESHES FOR MORE EFFICIENT PROCESSING

[75] Inventor: Louis K. Arata, Mentor, Ohio

[73] Assignee: Picker International, Inc., Highland Heights, Ohio

[21] Appl. No.: 324,419

[22] Filed: Oct. 14, 1994

[51] Int. Cl.$^6$ ................................................. G06T 17/20
[52] U.S. Cl. .......................... 382/128; 395/123; 382/285
[58] Field of Search ................... 364/413.13, 413.22, 364/413.18, 474.24, 578, 723; 382/128, 131, 132, 154, 196, 203, 209, 217, 220, 285; 395/119, 120, 141, 161, 125, 127, 130, 124, 134, 121, 123, 126, 135

[56] References Cited

U.S. PATENT DOCUMENTS

| | | | |
|---|---|---|---|
| 4,135,247 | 1/1979 | Gordon et al. | 364/414 |
| 4,525,858 | 7/1985 | Cline et al. | 382/1 |
| 4,710,876 | 12/1987 | Cline et al. | 364/414 |
| 4,729,098 | 3/1988 | Cline et al. | 364/413.18 |
| 4,969,106 | 11/1990 | Vogel et al. | 364/508 |
| 5,125,038 | 6/1992 | Meshkat et al. | 382/22 |
| 5,282,140 | 1/1994 | Tazawa et al. | 364/468 |
| 5,283,837 | 2/1994 | Wood | 382/6 |
| 5,367,465 | 11/1994 | Tazawa et al. | 364/468 |
| 5,379,225 | 1/1995 | Tazawa et al. | 364/468 |
| 5,553,206 | 9/1996 | Meshkat | 395/123 |

OTHER PUBLICATIONS

"Decimation of Trangle Meshes", Schroeder, et al., Computer Graphics, 26, 2, Jul. 1992, pp. 65–70.
"Re–Tiling of Polygonal Surface", Turk, Computer Graphics, 26, 2, Jul. 1992.
"Simplification of Objects Rendered by Polygonal Approximations", DeHaemer, et al., Computers & Graphics, vol. 15, No. 2, 1991, pp. 175–184.
"SuperFaces: Polyhedral Approximation with Bounded Error", Kalvin, et al., RC 19135 (82286) Apr. 2, 1993, Computer Science 25 pg.
"Constructing Topologically Connected Surfaces for the Comprehensive Analysis of 3D Medical Structures", Kalvin, et al., SPIE Medical Imag. V, 1991, 14 pg.
"Computer Graphics Proceedings" vol. 26, No. 2, Jul. 1992, Siggraph Conference Proceedings, Jul. 26–31, 1992, pp. 65–70.
"Geometric Optimization", Hinker, et al., Visualization'93 Proceedings, Oct. 25–29, 1993, San Jose California, Publ. Date Oct. 25, 1993, pp. 189–195.

(List continued on next page.)

*Primary Examiner*—Michael T. Razavi
*Assistant Examiner*—Larry J. Prikockis
*Attorney, Agent, or Firm*—Fay, Sharpe, Beall, Fagan, Minnich & McKee

[57] ABSTRACT

A volume image memory (24) stores an electronic image representation of a volumetric region, such as the volumetric region examined by a medical diagnostic scanner (10). A sub-region of interest of the volume is selected (30) and the surface of the selected region or object of interest is divided into triangular surface regions with a triangular surface processor (38). A vertex merging processor (40) examines the triangles to locate vertices spaced by less than a preselected minimum. Vertices closer than the preselected minimum are replaced with a vertex at a median position merging the triangle into adjacent triangles. A vertex removal processor (50) identifies groups of triangles having a common vertex ($V_c$) that form a pyramid. The surface normals (N) of the triangles which define the pyramid are examined to determine whether they are within a preselected deviation of parallel. The altitude of the pyramid, i.e., a distance between the common vertex and an average plane ($P_{avg}$) of the triangles is compared with a preselected maximum height. Triangular groups which pass the surface normal and maximum height tests have their common vertex removed (72) and are retriangulated (74) to reduce the number of triangles by two. An image processor (84) converts the relative angles of viewing and illumination directions relative to the surface normal of each visible triangle into a corresponding image value, e.g. gray scale, for display on a video monitor (34).

12 Claims, 2 Drawing Sheets

OTHER PUBLICATIONS

"An Efficient Method of Triangulating Equi–Valued Surfaces by Using Tetrahedral Cells", Doi, et al., IEICE Transactions, vol. E74, No. 1, Jan., 1991, Tokyo JP, Manuscript Rec'd Jun. 21, 1990; pp. 214–224.

"Optimizing Triangulations by Curvature Equalization", Scarlatos, et al., Visualization '92 Proceedings, Oct. 19–23, 1992, Boston Mass, Publ. Date Oct. 19, 1992, pp. 333–339.

"Method of Thinning Polygonal Volume Data for Scientific Visualization", IBM Technical Disclosure Bulletin, Apr. 1993, vol. 36, No. 4, Armonk, NY pp. 149–154.

"Surface Modelling of Range Data by Constrained Triangulation", Chen, et al., Computer–Aided Design, vol. 26, No. 8, Aug., 1994, Oxford, GB, pp. 632–645.

"Simplification of Triangle Meshes For Fast Surface Rendering of Tomographic Data", Arata, Proceedings of 1994 IEEE NSS '94, Oct. 30–Nov. 5, 1994, vol. 3, 1995, New York, NY pp. 1438–1442.

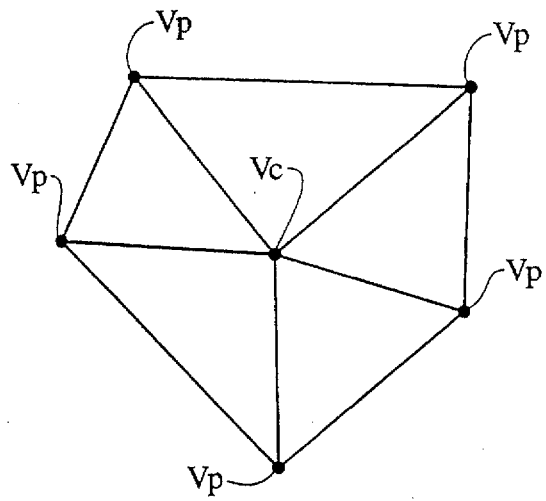
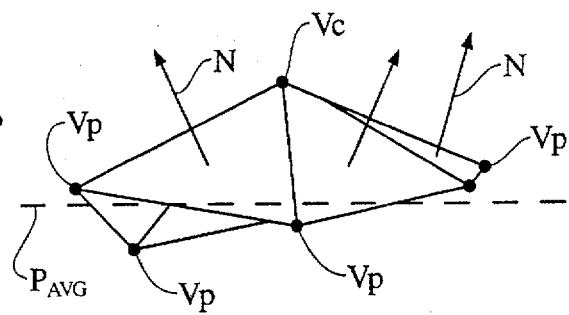
Fig.2     Fig.3
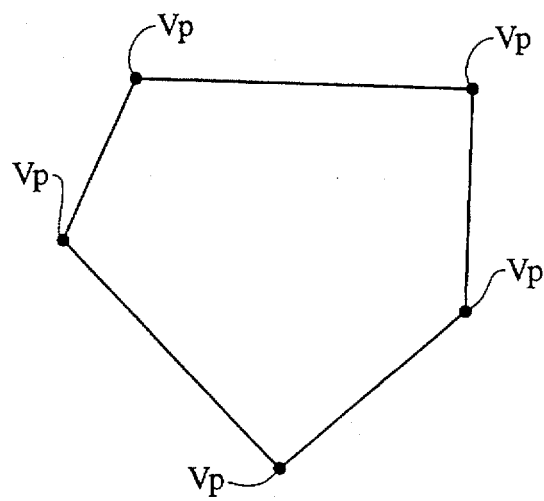
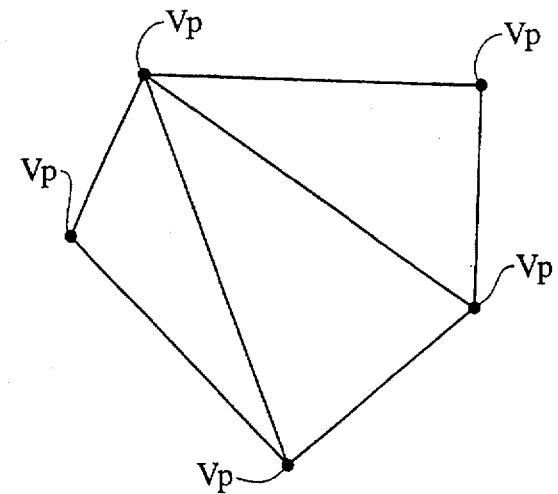
Fig.4     Fig.5

PROCEDURE FOR THE SIMPLIFICATION OF TRIANGULAR SURFACE MESHES FOR MORE EFFICIENT PROCESSING

BACKGROUND OF THE INVENTION

The present invention relates to the image manipulation arts. It finds particular application in conjunction with three-dimensional surface renderings and will be described with particular reference thereto.

Heretofore, three-dimensional surface renderings have commonly been made using a constant triangular mesh over the surface of interest. That is, a surface of interest of a computer generated three-dimensional image representation is selected. For example, one might use a nuclear, CT scanner, or other diagnostic imaging device to generate a three-dimensional image representation of a portion of a patient's torso surrounding the liver. Using conventional techniques, such as comparing the gray scale or CT number of each pixel in the image with a characteristic gray scale or CT number for the liver, one can identify the liver and the surface of the liver. Because all of the liver surface tissue has substantially the same gray scale or CT number, if a perspective view of the liver were recreated and displayed on a video monitor, the resultant display would have the appearance of a silhouette. There would be substantially no surface texture information conveyed.

In order to convey contour information, the surface of the liver or other structure which is visible from a viewing direction is overlaid with a constant triangular mesh. That is, the surface of the liver or other object of interest is approximated by a mesh of triangles of as uniform a size as permitted by the surface texture. In a typical 512×512 medical diagnostic image, one might expect to find about 20,000–50,000 triangles on the surface of interest. A surface normal is projected from a centroid or other characteristic location oneeach triangle of the mesh. The vector surface normals are each compared with an illumination direction vector and a viewing direction vector. Based on the vector comparison, a gray scale (or color or hue) for each triangle is selected. Typically, the gray scales are selected to approximate the lighting and shading conditions that an object of the selected configuration would have at the corresponding point on the surface when viewed from the viewing direction and illuminated from the illumination direction.

The display may represent more than just the surface of the object. In particular, one can commonly define a cut plane on a medical diagnostic image and remove the portion of the object to one side of the cut plane. The portions of the image corresponding to the interior of the liver or other object of interest are displayed with appropriate gray scales or colors which correspond to the CT numbers or pixel values of each internal pixel of the liver or other structure that is intercepted by the slice. The remaining surface portion continues to be displayed with three-dimensional surface rendering.

Typically, the operator has the ability to rotate the displayed object. Each time the object rotates an incremental distance, the surface normals are again computed and compared with the illumination and viewing direction vectors and reassigned gray scale values to each triangle in accordance with the comparison. The large number of calculations necessary to reassign the gray scales are commonly slow relative to the rotation rate of the object. That is, the operator rotates the object faster than the new gray scales can be computed causing the object to appear to rotate in jumps rather than smoothly. For example, if an object rotates about 5° in the time necessary to recalculate the gray scale values, then the object appears to rotate in 5° steps.

"Decimation of Triangle Meshes" by Schroeder, et al., *Computer Graphics*, Vol. 26, No. 22, pgs. 65–70, July 1992, describes an algorithm which reduces the number of triangles required to model a physical or abstract object. In the Schroeder technique, multiple passes are made over an existing triangular mesh using local geometry and topology to remove vertices that pass a distance or angle criterion. Holes left by the vertex removal are patched using a local triangulation process. One difficulty with the Schroeder technique is that it is relatively slow. A time on the order of minutes is required to run the technique. Commonly, radiologists expect CT, nuclear camera and magnetic resonance images substantially in real time and do not find waiting on the order of minutes acceptable.

The present invention provides a new and improved three-dimensional triangle mesh simplification technique which overcomes the above referenced problems and others.

SUMMARY OF THE INVENTION

In accordance with the present invention, a method of three-dimensional triangle mesh simplification is provided. First, the distance between neighboring vertices is examined and compared with a minimum distance to identify degenerate or substantially degenerate triangles, i.e., triangles whose area is zero or near zero. Second, triangles sharing a common vertex are examined to determine whether the triangles are co-planar within a preselected tolerance. When a plurality of triangles having a common vertex are coplanar within the preselected tolerance, the vertex is removed and the remaining polygon is retrianqulated with a lesser number of triangles. Thereafter, the surface normals are projected and an appropriate gray scale selected for each triangle.

In accordance with a more limited aspect of the present invention, after removing a common vertex of a plurality of generally coplanar triangles, the remaining vertices are projected onto a common average plane. The polygon is retriangulated using a triangulation algorithm, e.g. delaunay triangulation algorithm, which minimizes the largest angle of the triangles to avoid obtuse angles and long skinny triangles. After retriangulation, the new connections are reinserted into the original grid.

One advantage of the present invention is that it accelerates rendering three-dimensional surface rendered images.

Another advantage of the present invention is that it speeds up the process of triangle decimation.

Another advantage of the present invention is that the image can be rotated more quickly and more smoothly.

Another advantage of the present invention is that it reduces the number of triangles in a triangular mesh which defines the surface in a three-dimensional surface rendered image thus saving computer memory.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 2 is a top view of a plurality of triangles with a common vertex;

FIG. 3 is a side view of FIG. 2;

FIG. 4 illustrates a polygon formed by the common vertex removal;

FIG. 5 illustrates an exemplary triangular simplification of the polygon of FIG. 4.

DETAILED DESCRIPTION OF THE PREFERRED EMBODIMENT

Figure 1:
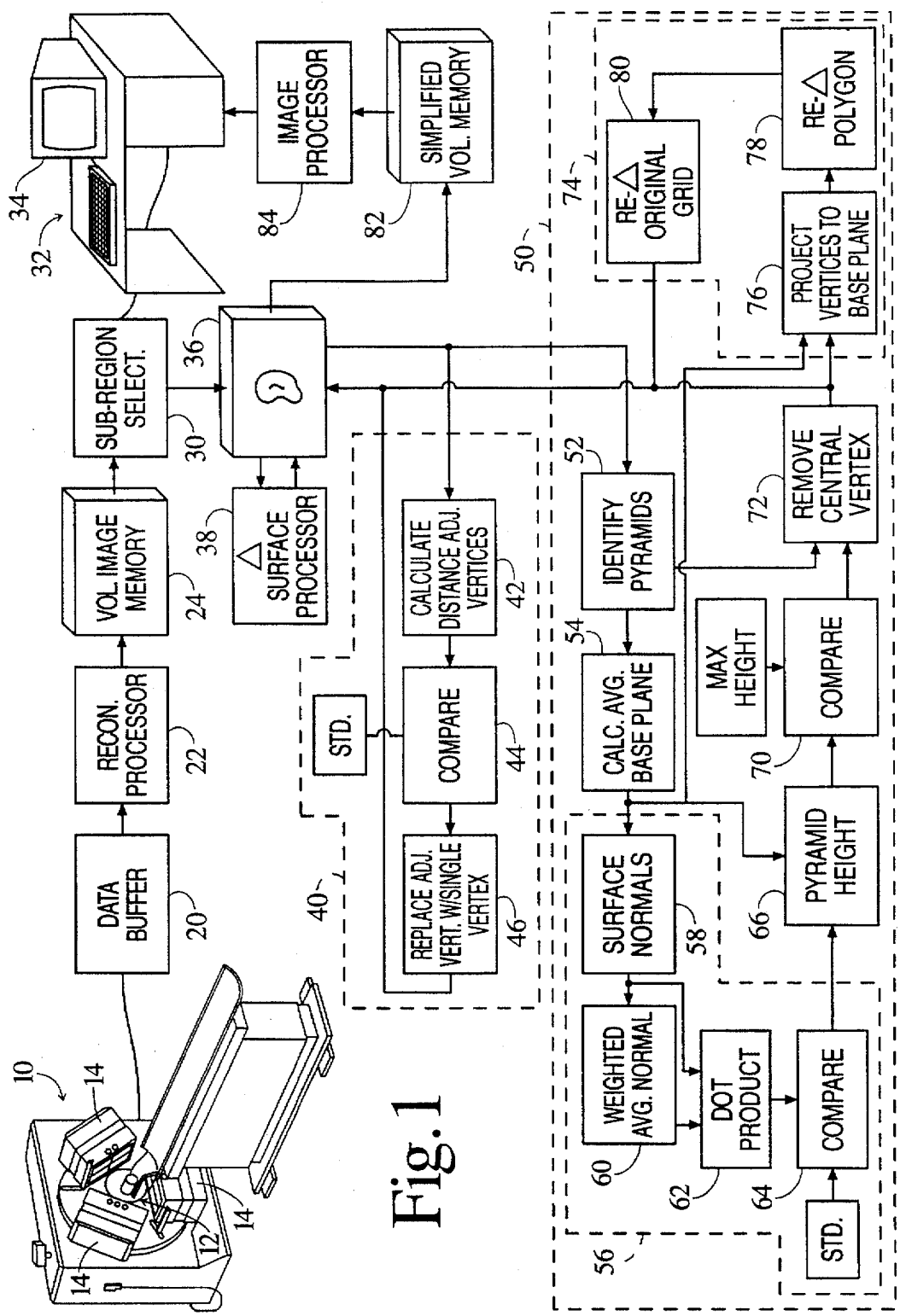
FIG. 1 is a diagrammatic illustration of a diagnostic imaging and image display system in accordance with the present invention.

A medical diagnostic imaging device 10, such as a nuclear camera, CT scanner, magnetic resonance imager, or the like, performs a non-invasive examination of a subject disposed in examination region 12. In the nuclear camera embodiment, one or more detector heads 14 detect emitted radiation from a radio isotope injected into a subject as well as transmitted radiation from a radiation source 16. Each of the detector heads includes a scintillation crystal which is elongated in both an axial and circumferential direction. Photomultiplier tubes monitor radiation events on the scintillation crystal and produce electrical signals indicative of a ray along which each radiation event was received and,the energy of each radiation event. The energy can be used to distinguish between emitted and transmitted radiation, between two different radio isotopes, or the like. Because the nuclear camera detector head 14 has a two-dimensional radiation receiving area, the output data from the rotating head is indicative of a three-dimensional volume, e.g. a plurality of parallel slices transverse to an axis about which the detector heads are rotated. Other diagnostic imaging apparatus such as magnetic resonance imagers, CT scanners, spiral trajectories CT scanners, and the like which generate data indicative of a volumetric region of the subject are also contemplated.

Lines or views of data from the diagnostic imaging apparatus are stored in a data buffer 20. A reconstruction processor 22, reconstructs the data into a volumetric image representation. In the illustrated SPECT nuclear camera, a filtered backprojector backprojects and filters each line of data from the data buffer into a volume image memory 24. Other techniques for reconstructing diagnostic data from other imaging modalities are also contemplated as are known in the art.

Although the volume image data of the preferred embodiment is medical diagnostic image data, it is to be appreciated that the present invention is applicable to a volumetric data from other sources. Such other sources might include models such as from a CAD-CAM system, terrain data from satellite or aerial surveillance, and other techniques which convert a three-dimensional object or its surface into an electronic image representation.

A sub-region selection processor 30 under control of an operator at an operator terminal 32 selects a sub-region of the three-dimensional diagnostic image for display. For example, in medical diagnostic imaging, each type of tissue commonly has a common value, CT number, gray scale, count density, or the like. By examining the entire volumetric region for tissue with a characteristic value, a sub-region of interest is identified. For a more accurate representation, it is common to "grow" the sub-region of interest. That is, a pixel or group of pixels of the characteristic value are displayed on a video monitor 34 for the operator to review. The operator indicates the position of the organ of interest in the volume. Thereafter, the sub-region selection processor examines pixels of the characteristic value which are contiguous to the operator selected coordinate and grows the region of contiguous pixels from the selected coordinate outward. Discontinuous pixels of the same value are discarded to remove noise.

For convenience of explanation, the selected sub-region is illustrated as transferred to a selected sub-region memory 36. In the selected sub-region memory 36, pixels of the volumetric object of interest are given a common value and the remaining pixels are given the value indicative of air or another value which makes them readily identifiable and transparent for calculation purposes. Although indicated as a separate memory, it is to be appreciated that in many applications, the selected sub-region memory is incorporated in the volume image memory 24.

A triangular surface processor 38 re-defines the surface of the selected sub-region as a constant triangle mesh, i.e, approximates the surface with triangles. When the triangular mesh is fitted to a contoured surface, some of the triangles become compressed forming thin elongated triangles. Some of the triangles are degenerate, i.e. they are so thin that they have zero area. A vertex merging processor or program in a general purpose processor 40 performs a vertex merging step on the triangles of the triangular mesh surface. The vertex merging step eliminates such degenerate and substantially degenerate triangles. More specifically, the vertex merging processor 40 performs a routine 42 which calculates a distance between each adjacent vertex. A comparitor or comparing step 44 compares the distance between vertices with a preselected standard. Whenever a pair of adjoining vertices is less than the standard, a routine or step 46 replaces the pair of adjacent vertices with a single vertex at .an intermediate, preferably the median, position. In this manner, triangles which are very thin as compared to the standard are removed and their area divided among two adjacent triangles.

A vertex removal processor 50 identifies vertices which are common to a plurality .of generally coplanar triangles, eliminates the common vertex, and retriangulates the remaining polygon with a smaller number of triangles. More specifically, a routine or step 52 identifies cycles of triangles that define pyramids, i.e. triangles with a common vertex $V_c$ such that each edge attached to $V_c$ forms the boundary between exactly two of the triangles. A top view of such a cycle of triangles is shown in FIG. 2. A routine or step 54 calculates an average plane of the cycle of triangles. As illustrated in FIG. 3, the peripheral vertices $V_p$ are not normally coplanar with each other. A plane $P_{avg}$ is calculated which is the average or closest plane to all of the triangles. A routine or step 56 calculates how flat the pyramid is. More specifically, the routine 58 calculates surface normals N of each of the triangles of the cycle. A weighted average normal determining routine or step 60 weights each normal by the area of the corresponding triangle and determines a weighted average normal $N_{avg}$. A dot product routine or step 62 determines a difference between each normal and the weighted average normal. A comparing routine or step 64 compares the deviation of the normals from the weighted average normal with a standard to determine whether the normals are all within a preselected range of parallel.

If the normals are not sufficiently coplanar or sufficiently close to parallel, then the pyramid is accepted and not adjusted further. If the normals are sufficiently close to parallel, then a routine or step 66 calculates the pyramid height. That is, the distance from the average plane $P_{avg}$ to the central vertex $V_c$ is determined.

A comparing routine or step 70 compares the pyramid height with a preselected height. If the pyramid is taller than the preselected height it is accepted as is and no vertices are removed. If the pyramid is below the preselected height, then a routine or step 72 removes the central vertex $V_c$. See FIG. 4. A retriangulation routine or step 74 retriangulates the polygon defined by the peripheral vertices $V_c$. See FIG. 5. By comparing FIGS. 3 and 5, it will be seen that for a polygon with five peripheral vertices, the number of triangles is reduced from five to three. The number of triangles is always reduced by two with this procedure.

More specific to the preferred embodiment, the retriangulation routine 74 includes a routine or step 76 which projects the peripheral vertices $V_p$ onto the average plane $P_{avg}$. A routine or step 78 retriangulates the coplanar vertices using a conventional delaunay triangulation algorithm. The delaunay triangulation algorithm is preferred because it avoids long sliver triangles by minimizing their maximum angles to avoid obtuse angles and long skinny triangles. Once the connections are decided by the delaunay triangulation algorithm on the coplanar projected peripheral vertices, a step or routine 80 makes the determined connections 78 on the original grid, i.e. between the peripheral vertices in their actual position.

The vertex removal process is preferably repeated at least once. The vertex removal process may be iteratively repeated until it fails to remove a substantial number of vertices. In this manner, the surface in memory 36 is retriangulated to have a lesser number of triangles.

The retriangulated surface can be moved to a different memory 82 to free the memory 36 to triangulate another surface. An image processor 84 is controlled by an operator through the work station 32 to select a viewing direction. The image processor then identifies the triangles visible from the viewing direction. The image processor further defines a direction of illumination and a vector normal for each visible triangle. The image processor then calculates or, preferably, retrieves from a look-up table, a gray scale value for each triangular region in accordance with the relative directions of the surface normal, viewing direction, and illumination direction, as is conventional in the art. Each time the operator rotates the viewing direction, the differences between the surface normals, viewing direction, and illumination direction for each visible triangle are recalculated. When the number of triangles is reduced by the present technique, often by a factor of half or even two-thirds, the calculation time is reduced analogously, such as by half or even two-thirds. This enables the image displayed on the video monitor 34 to rotate smoothly to the viewer.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In a medical diagnostic imaging apparatus which includes a patient examination apparatus for non-invasively examining an internal volumetric region of a patient and generating views of electronic data indicative thereof, a reconstruction processor for reconstructing the views into a volumetric image representation which is stored in an image memory, a triangular surface processor for replacing a surface of a selected volumetric region of the volumetric image representation in the image memory with a triangular mesh, an image processor for comparing (i) a viewing direction, (ii) an illumination direction and (iii) a surface normal of each viewable triangle of the triangular mesh to generate a corresponding image value, and an image display device for converting the image values into a corresponding human-readable image, the improvement comprising:

a vertex merging processor which collapses long, narrow triangles to lines such that long, narrow triangles of the triangular mesh that have a dimension smaller than a preselected minimum are collapsed into a straight line with their areas being split and merged into adjoining triangles; and a vertex removal processor for removing a vertex shared by a plurality of triangles which are within a preselected tolerance of co-planar and retriangulating a polygon defined by the remaining peripheral vertices of the triangles with a smaller number of triangles, the vertex removal processor including:

a means for identifying a vertex common to a group of triangles which define a pyramid;

a means for determining an average plane of the vertices of the pyramid;

a means for comparing deviation among the surface normal of each viewable triangle of the pyramid for a preselected maximum deviation;

a means for determining a distance between the average plane and the common vertex to determine a height of the pyramid; and a means for comparing the pyramid height with a preselected maximum pyramid height.

2. In a medical diagnostic imaging apparatus which includes a patient examination apparatus for non-invasively examining an internal volumetric region of a patient and generating views of electronic data indicative thereof, a reconstruction processor for reconstructing the views into a volumetric image representation which is stored in an image memory, a triangular surface processor for replacing a surface of a selected volumetric region of the volumetric image representation in the image memory with a triangular mesh, an image processor for comparing: (i) a viewing direction, (ii) an illumination direction, and (iii) a surface normal of each viewable triangle of the triangular mesh to generate a corresponding image value, and an image display device for converting the image values into a corresponding human-readable image, the improvement comprising:

a means for identifying a vertex common to a group of triangles which define a pyramid;

a means for determining an average plane of the vertices of the pyramid;

a means for determining a distance between the average plane and the common vertex to determine a height of the pyramid;

a means for comparing the pyramid height with a preselected maximum pyramid height;

a means for removing the common vertex of the group of triangles which define each pyramid whose height is less than the preselected maximum pyramid height;

a means for projecting the peripheral vertices onto the average plane to define a planar polygon;

a means for retriangulating the planar polygon on the average plane; and a means for connecting corresponding peripheral vertices in the image memory in accordance with the retriangulating on the average plane.

3. In an imaging system as which includes a memory for storing a volumetric image representation, a triangular surface processor for replacing a surface of a selected volumetric region of the volumetric image representation in the image memory with a triangular mesh, an image processor for comparing a viewing direction, an illumination direction and a surface normal to a plane of each visible triangle of the triangular mesh to generate a corresponding image value, and an image display device for converting the image values into a corresponding human readable image, the improvement comprising:

a vertex merging means for merqing triangles of the triangular mesh that have a dimension less than a preselected minimum dimension into adjoining triangles; and a vertex removal means for removing a vertex shared by a plurality of triangles which are within a preselected tolerance of co-planar and retriangulating a polygon defined by remaining peripheral vertices of the triangles with a smaller number of triangles, the vertex removal means further including:

a means for identifying vertices common to a group of triangles which define a pyramid;

a means for determining said surface normals to a plane of each triangle of the identified group of triangles;

a means for determining for each pyramid an average plane of the triangles;

a means for determining for each pyramid a distance between the average plane and the common vertex to determine a height of the pyramid; and a means for comparing each pyramid height with a preselected maximum pyramid height.

4. In the imaging system as set forth in claim 3, the improvement further comprising:

a means for removing the common vertex of the group of triangles which define each pyramid whose surface normals diverge less than the preselected divergence and whose height is less than the preselected maximum pyramid height;

a means for retriangulating peripheral vertices into a smaller number of triangles without a common vertex.

5. In an imaging systme which includes a memory for storing a volumetric image representation, a triangular surface processor for replacing a surface of a selected volumetric region of the volumetric image representation in the image memory with a triangular mesh, an image processor for comparing a viewing direction, an illumination direction and a surface normal of each visible triangle of the triangular mesh to generate a corresponding image value, and an image display device for converting the image values into a corresponding human readable image, the improvement comprising:

a means for removing a common vertex shared by a plurality of non-coplanar triangles defined by the common vertex and a plurality of peripheral vertices to create a three-dimensional polygon;

a means for projecting the peripheral vertices of the three-dimensional polygon onto a plane to define a two-dimensional polygon;

a means for triangulating the two-dimensional polygon projection on the plane in two dimensions; and a means for connecting corresponding peripheral vertices of the three-dimensional polygon in the image memory in accordance with the two-dimensional triangulation of the two-dimensional polygon projection on the plane such that the peripheral vertices are three-dimensionally retriangulated.

6. An imaging system comprising:

an image memory which selectively stores a three-dimensional electronic image representation;

a triangular surface processor which replaces a selected surface or a surface of a selected volumetric region of the three-dimensional electronic image representation in the image memory with a mesh of triangular surfaces;

a vertex removal processor for removing a vertex shared by a plurality of triangular surfaces which are within a preselected tolerance of coplanar and without replacing the removed vertex retriangulating a polygon defined by remaining peripheral vertices of the triangular surfaces with a smaller number of triangular surfaces, whereby a number of the triangular surfaces in the mesh is reduced, the vertex removal processor including:

a means for identifying an apex vertex common to each group of triangular surfaces which define a pyramid, a means for determining an average plane of the vertices composing each pyramid, a means for determining a normal to each triangular surface defined by the mesh;

a means for determining deviation among the surface normals of the triangular surfaces of the pyramid, a means for removing the apex vertex of a group of triangular surfaces which define a pyramid whose surface normals diverge less than a preselected divergence and whose height is less than a preselected maximum height to define a polygon, a means for projecting the polygon onto the average plane, a means for triangulating a polygon defined by peripheral vertices of each group after the apex vertex removal;

an image processor which compares viewing and illumination directions with the surface normals of the triangular surfaces of the mesh to determine a corresponding image value; and an image display device for converting the image values into a corresponding human-readable image.

7. The imaging system as set forth in claim 6 further including:

a non-invasive examination apparatus for non-invasively examining a three-dimensional volume of a subject and generating views of electronic data indicative thereof; and a reconstruction processor for reconstructing the views into the three-dimensional image representation for storage in the image memory.

8. The imaging system as set forth in claim 7 wherein the non-invasive examination apparatus includes one of a nuclear camera, a CT scanner, and a magnetic resonance imaging apparatus.

9. The imaging system as set forth in claim 6 further including:

a means for comparing a distance between adjoining pairs of vertices with a preselected minimum distance;

a means for calculating a median position between the pairs of vertices which are separatedby less than the preselected minimum distance, placing a new vertex at the median position, and removing the pair of vertices, whereby the triangular surfaces defined in part by vertices with less than the preselected minimum dimension are merged into adjoining triangular surfaces.

10. An imaging method comprising:

replacing a surface of a selected volumetric region of a volumetric image representation with a mesh of triangles;

identifying vertices common to a group of triangles which define a pyramid;

determining an average plane of the group of triangles;

comparing deviation among surface normals of the identified group of triangles that define the pyramid with a preselected deviation;

determining a distance between the average plane and the common vertex to determine the height of the pyramid;

comparing the pyramid height with a preselected maximum pyramid height;

removing the vertex common to each identified group of triangles whose surface normals deviate by less than the preselected deviation and whose pyramid height is less than the preselected maximum pyramid height;

projecting the peripheral vertices onto the average plane to define a planar polygon on the average plane;

triangulating the planar polygon on the average plane;

connecting the peripheral vertices which were projected onto the average plane in accordance with the triangulating of the planar polygon;

comparing viewing and illumination directions with the surface normal of each viewable triangle to generate a corresponding image value; and converting the image values into a corresponding image.

11. An imaging method comprising:

replacing a surface of a selected volumetric region of a volumetric image representation with a triangular mesh;

merging triangles with a dimension less than a preselected minimum dimension into adjoining triangles, the merging step including:

comparing a distance between each pair of adjacent vertices with a preselected minimum distance;

calculating a median position between the adjacent vertices which are separated by less than the minimum distance;

placing a new vertex at the median position;

removing the pair of vertices;

removing a vertex shared by a group of triangles which are within a preselected tolerance of coplanar;

projecting the remaining vertices of the group of triangles onto a common plane;

on the common plane, retriangulating a polygon defined by projections of the remaining peripheral vertices of the group of triangles with a smaller number of triangles;

connecting the remaining peripheral vertices in accordance with the retriangulation on the common plane;

comparing viewing and illumination directions with a surface normal of each viewable triangle to generate a corresponding image value; and converting the image values into a corresponding image.

12. The imaging method as set forth in claim 11 further including:

non-invasively examining an internal volumetric region of a patient and generating views of electrical data indicative thereof;

reconstructing the views into the volumetric image representation.

* * * * *